May 1, 1951 S. D. RUSSELL 2,551,222
BALE TIE
Filed Dec. 13, 1946
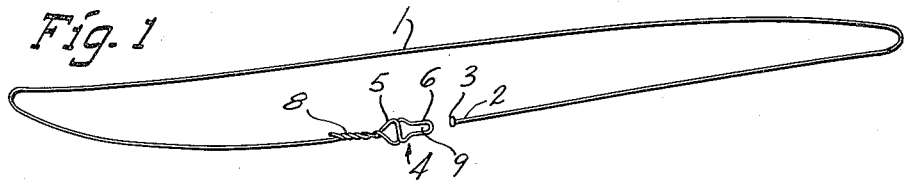
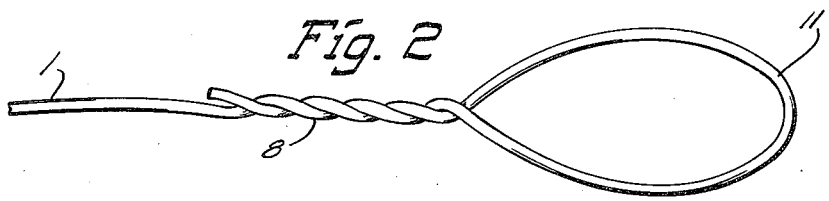
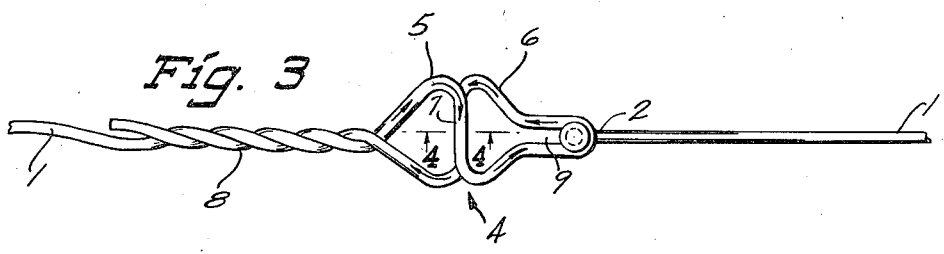
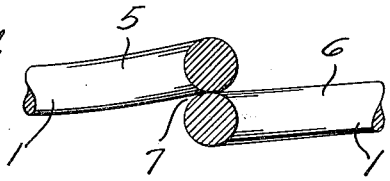
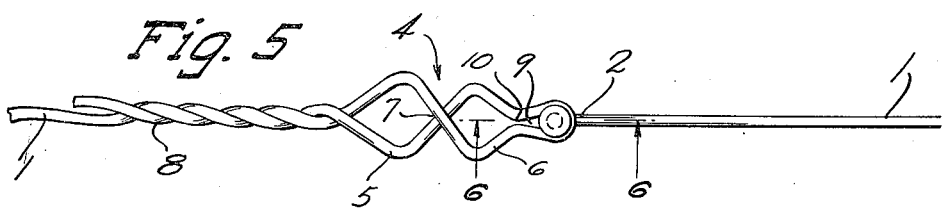
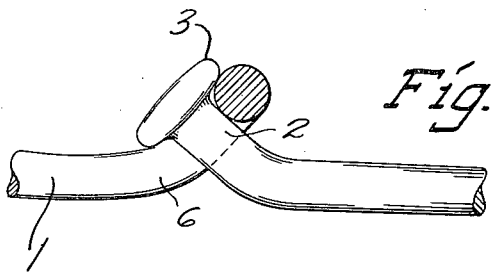
INVENTOR.
Stanley D. Russell
BY
Attorney Patented May 1, 1951

2,551,222

UNITED STATES PATENT OFFICE 2,551,222

BALE TIE

Stanley D. Russell, Racine, Wis., assignor to J. I. Case Company, Racine, Wis., a company of Wisconsin Application December 13, 1946, Serial No. 715,989

4 Claims. (Cl. 24—27)

This invention relates to bale ties and methods of making the same and has particular reference to bale ties for confining material such as hay, straw, paper and the like which is compressed when baled and expands when released from the baling machine.

One object of the invention is to provide a bale tie that prevents the tie from becoming unhooked previous to the time the baled material expands and the tie is drawn taut.

Another object of the invention is to provide a novel and inexpensive way of preventing the bale tie from becoming unfastened when slack.

A further object of the invention is to provide double loops in a bale tie, one of which on collapsing confines the head of the tie.

Another object of the invention is to provide a method of looping bale wire that permits confining a head in one of the loops by placing the loops momentarily under moderate tension.

Another object is to provide a double looped bale tie which initially breaks down with substantial ease when the bale wire is pulled by the operator.

These and other objects of the invention will appear hereinafter in connection with the following description of the drawing illustrating the invention.

In the drawing:

Figure 1 is a perspective view of a bale wire with the ends disposed for fastening together;

Fig. 2 is a perspective view of one of the first forming steps in making the looped end;

Fig. 3 is a top plan view after initial forming of the looped ends of the tie with the head in place;

Fig. 4 is an enlarged longitudinal section taken on line 4—4 of Fig. 3;

Fig. 5 is a plan view of the bale tie after the same has been placed under longitudinal tension, showing the collapse of the loops to lock the head in place; and Fig. 6 is an enlarged longitudinal section through the head and outer loop, after collapse of the loops taken on line 6—6 of Fig. 5.

In the baling of material such as hay, straw, paper or the like, the baling machine compresses the material to be baled into a tightly compressed bale. While the bale is held tightly compressed, wire is wrapped around the bale to hold it as compact and securely as possible when the bale is released from the baling machine. The wire will often be slack when wrapped around the bale and then be drawn taut immediately by expansion of the bale when released.

When the wire is slack the bale tie is likely to become unfastened unless some provision is made to maintain the head in place within the tie.

The bale wire 1, in the drawing illustrating the present invention, is provided at one end with the bale head 2 and at the other end with the double loops 4.

Head 2 is flanged at 3 to more readily secure the same within looped end 4 and the body of the head corresponds substantially to the diameter of wire 1 or may be wire 1 itself. The flange 3 of head 2 is preferably formed in a manner similar to forming the head of a nail and need not be further described.

Looped end 4 comprises the inner loop 5 and the outer loop 6 which cross each other at the overlapping generally central joint 7.

The free end of wire 1 is twisted about the body of the wire at 8 to complete inner loop 5 and secure the free end in place.

Head 2 in the bale tie is confined within the longitudinal slot 9 of outer loop 6. Slot 9 is provided in the outer loop 6 in the initial forming of the looped end 4 and is substantially closed at the inner end 10 by collapse of the opposite sides of the loop, as will be described. Slot 9 when closed prevents escape of flange 3 of head 2 from the bale tie in the event wire 1 is slack.

Under one method of forming looped end 4, the large loop 11 as shown in Fig. 2 is first formed and the free end of wire 1 is twisted upon itself as at 8. The outer end of the loop 11 is then twisted in one direction and the inner end in the opposite direction until loops 5 and 6 are formed. Slot 9 is then formed and loops 5 and 6 brought to the special configuration shown in the drawings by a die forming no part of this invention.

After fabrication of loops 5 and 6 and slot 9 as described, one portion of wire 1 emerging from the twisted portion 8 passes diagonally outwardly of the general axis of the tie and upwardly of the general plane of the loops from the body portion of wire 1, then is bent sharply laterally to extend transversely to the body portion of the wire. The wire is then again bent sharply to extend diagonally downwardly and inwardly to form one side of outer loop 6. The outer loop is completed by the wire passing forwardly and then backwardly to form slot 9 by a reverse bend and then downwardly and outwardly on a diagonal, it then being bent sharply laterally to extend substantially transversely of the body of the wire and underneath the first transverse strand of the wire at joint 7. The wire is again bent sharply to extend backwardly and diagonally inwardly and upwardly from joint 7 to be twisted upon itself at 8 to close inner loop 5. The slight upward and downward bending of the wire described above refers to the bending required to pass the second transverse portion underneath the first transverse portion at the joint between the loops. In general loops 5 and 6 are provided by complementary reverse bends of the wire in a larger loop and which cross at joint 7 and produce the figure 8 of the two loops.

Fig. 3 illustrates double looped end 4 after forming and with head 2 in place.

When wire 1 is wrapped about a bale the head 2 is inserted within outer loop 6 to position the head 2 in slot 9, as shown in Fig. 3. The operator then pulls on the wire in a direction generally radially outwardly from the bale which elongates loops 5 and 6 and collapses the same laterally. The sides of loop 6 collapse about the body of head 2 and converge at 10 to close slot 9 and prevent escape of the flange 3 of head 2 from the slot during the time that wire 1 is slack.

Due to the extreme angle of the wire relative to the direction of the pull by the operator, the force in the wire is multiplied many times over that exerted by the operator and the double loop breaks down with comparative ease to confine head 2 in slot 9.

The looped end 4 should be of sufficient length to form slot 9 about head 2 which will depend on the size of the head used and of the wire employed.

By employment of double loops formed by reverse bends of wire 1 the slot 9 is readily closed when the bale tie is placed under tension, as described, to prevent disengagement of head 2 from the tie since the wire is free to collapse laterally as the reverse bends of the wire tend to straighten by movement across each other at joint 7. Each side of outer loop 6 is free to collapse inwardly without opposition from the other side. The outer loop 6 can be collapsed almost twice the distance that a single loop could be collapsed. This enables the slot 9 to be readily closed to confine head 2, by the operator merely pulling the wire momentarily toward him or generally radially outwardly away from the bale.

Various embodiments of the invention may be employed within the scope of the accompanying claims.

I claim:

1. A bale tie comprising a closed loop at one end of the bale wire having a longitudinal slot at its outer end disposed to receive and hold a tie head on the other end of the bale wire, said loop having its inner end formed by laterally extending elements of substantial length, the free ends of said elements being bent backwardly and secured together at the body of the wire to provide a second closed loop supporting the first, said loops being capable of lateral collapse upon longitudinal tensioning of the same to effect closing of the slot upon the head.

2. A bale tie for baling wire having a head at one end and an inner and outer loop at the other end thereof, said loops comprising a wire portion passing diagonally outwardly and upwardly from the body of said wire to form one side of the inner loop, a portion bent laterally to extend transversely to the body of the wire, a portion extending diagonally downwardly and inwardly to form one side of the outer loop, a portion passing forwardly and then backwardly on a reverse bend to provide a slot in said outer loop disposed to receive said head and confine the same for fastening the tie, a portion extending downwardly and outwardly on a diagonal to complete the outer loop and then being bent transversely of the body of the wire and underneath the first named transversely extending portion to provide a joint therebetween, and a portion extending backwardly and diagonally upwardly from said joint and twisted about the body of the bale wire to complete said inner loop.

3. In a bale tie of wire having a loop on one end of the tie and a head on the other end of the tie adapted to be confined by the loop, the improvement wherein the loop comprises a double loop formed as a figure 8 with the inner loop carried by the wire and the outer loop formed in the shape of a slot at its outer end opening inwardly to receive and confine the tie head and with the overlapping central portions between the adjacent loops extending substantially normal to the axis of the tie to provide for a ready collapse of the loops and resulting deformation of the sides of the slot to close around the head when the tie is pulled tight.

4. A joint between a pair of aligned wire ends, comprising a head on one wire end and a loop portion on the other wire end, said loop portion comprising a double loop formed as a figure 8 with the inner loop carried by the wire and the outer loop formed in the shape of a slot at its outer end opening inwardly and receiving and confining said head and with the overlapping central portions between the adjacent loops extending substantially normal to the axis of the joint to provide for a ready collapse of the loops and resulting deformation of the sides of the slot to close around the head when the joint is pulled tight.

STANLEY D. RUSSELL.

REFERENCES CITED

The following references are of record in the file of this patent:

UNITED STATES PATENTS

| Number | Name | Date |
|---|---|---|
| 165,081 | Elliott | June 29, 1875 |
| 184,607 | France | Nov. 21, 1876 |
| 200,371 | Borst | Feb. 19, 1878 |
| 261,246 | Moses | July 18, 1882 |
| 301,482 | Davis | July 8, 1884 |
| 397,180 | Glauber | Feb. 5, 1889 |
| 466,609 | Lenox | Jan. 5, 1892 |
| 619,584 | Lenox | Feb. 14, 1899 |
| 690,819 | Anderson | Jan. 7, 1902 |
| 695,214 | Kilmer | Mar. 11, 1902 |
| 807,698 | Trahan et al. | Dec. 19, 1905 |
| 1,278,712 | Moore | Sept. 10, 1918 |
| 2,071,089 | Rowe | Feb. 16, 1937 |
| 2,091,626 | Bradley | Aug. 31, 1937 |
| 2,356,936 | Krause | Aug. 29, 1944 |

FOREIGN PATENTS

| Number | Country | Date |
|---|---|---|
| 25,692/30 | Australia | Mar. 17, 1931 |
| 612,093 | France | July 24, 1926 |